Oct. 12, 1965    A. P. WATERSON    3,210,871
LAND LEVELER
Filed Oct. 29, 1963    3 Sheets-Sheet 1
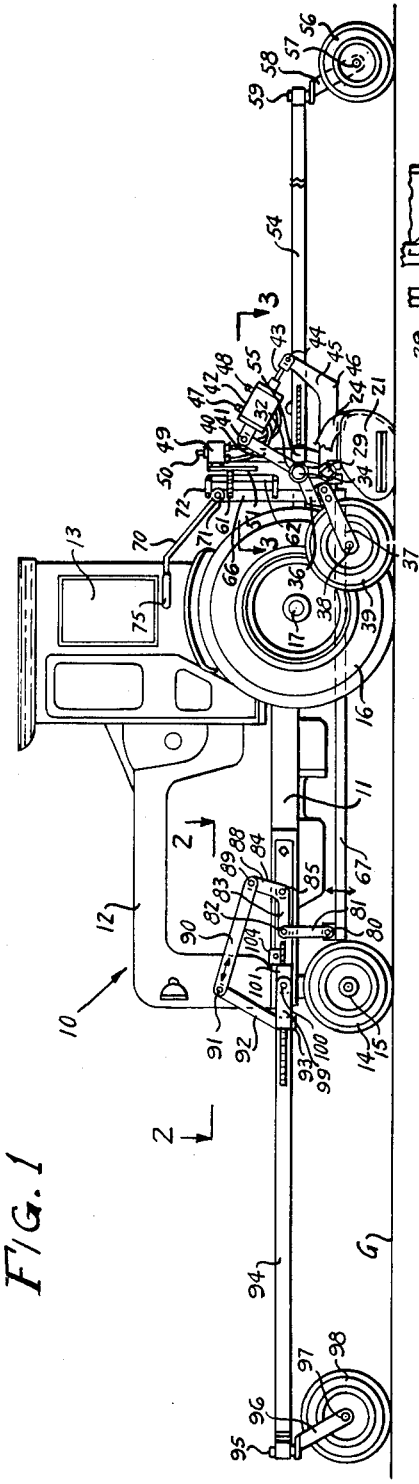
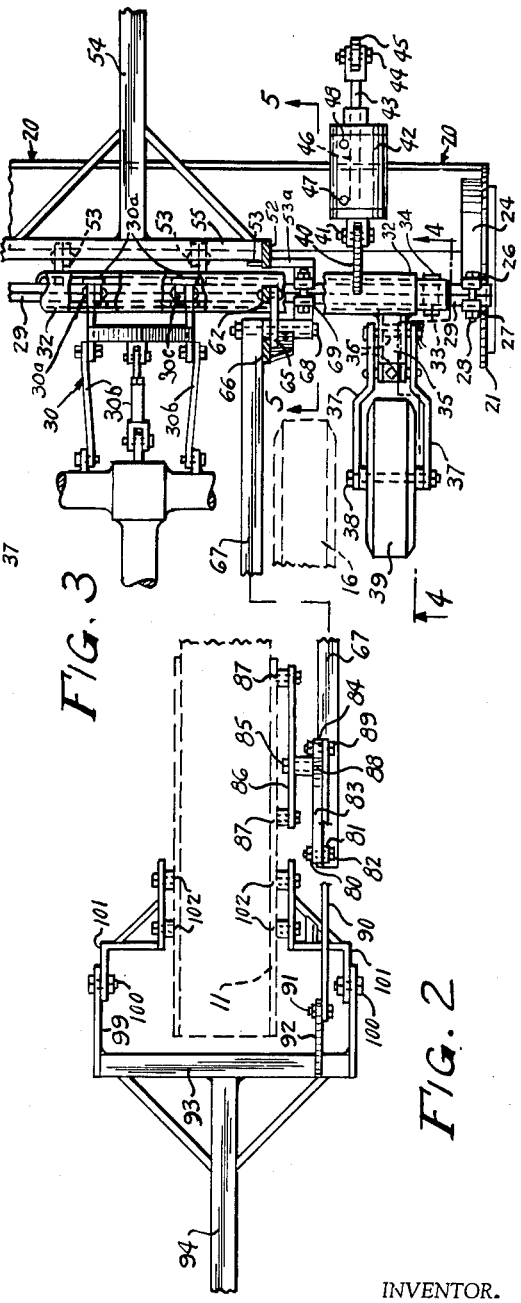
INVENTOR.
ARTHUR P. WATERSON
BY Kimmel, Crowell & Weaver
ATTORNEYS.

Oct. 12, 1965  A. P. WATERSON  3,210,871
LAND LEVELER
Filed Oct. 29, 1963  3 Sheets-Sheet 2
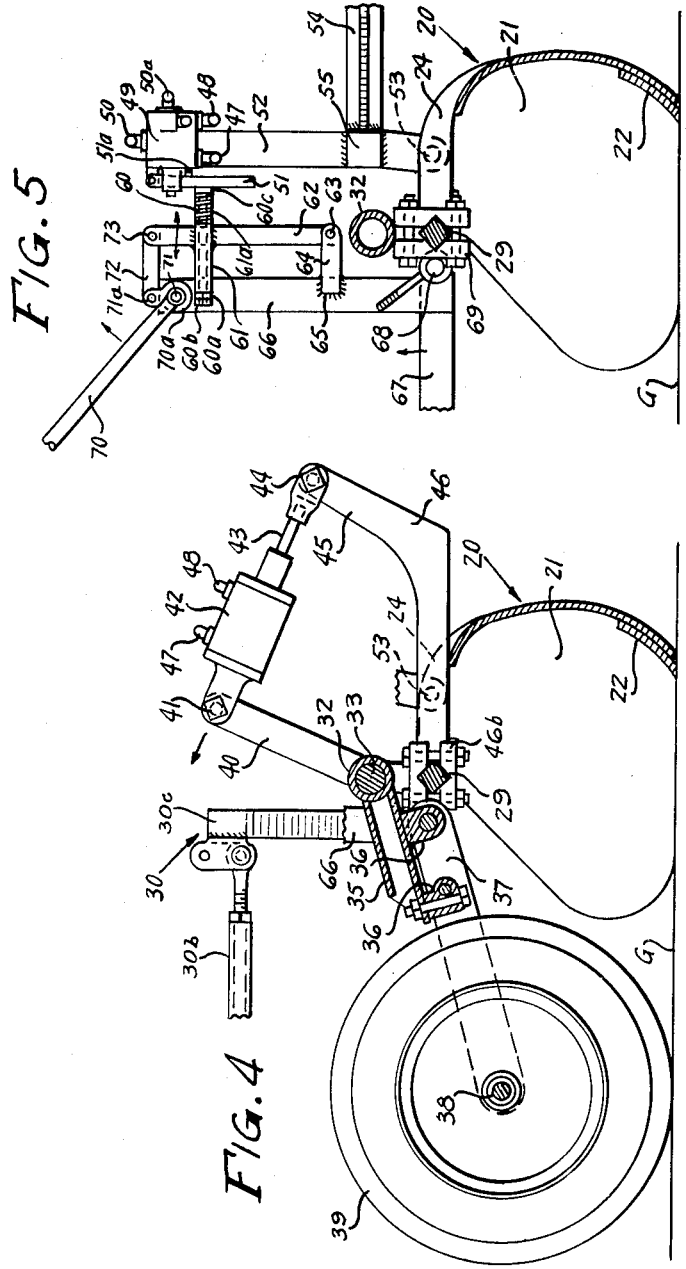
INVENTOR.
ARTHUR P. WATERSON
BY Kimmel, Crowell & Weaver
ATTORNEYS.

Oct. 12, 1965    A. P. WATERSON    3,210,871
LAND LEVELER
Filed Oct. 29, 1963    3 Sheets-Sheet 3
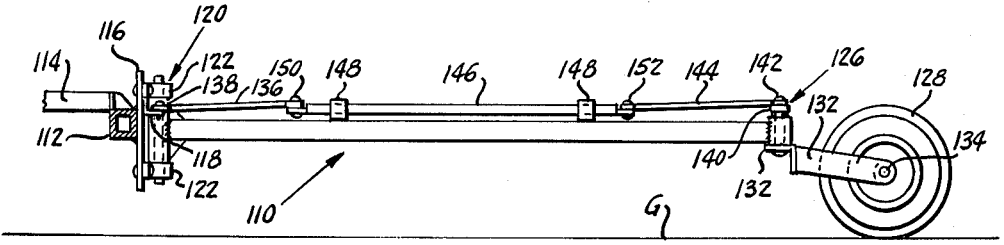
FIG. 6
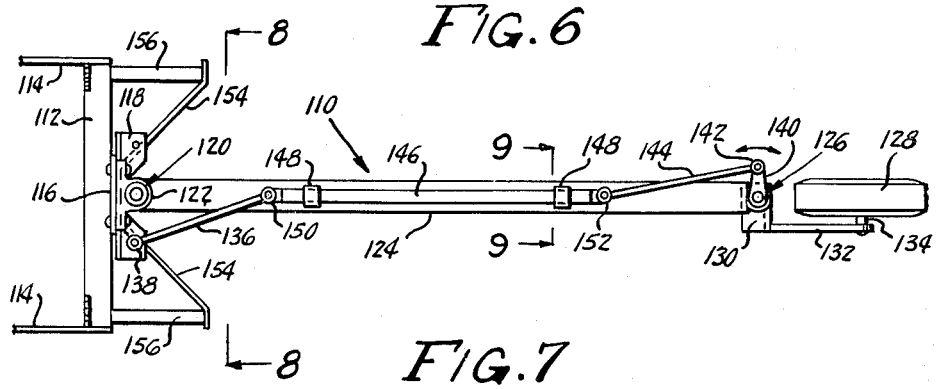
FIG. 7
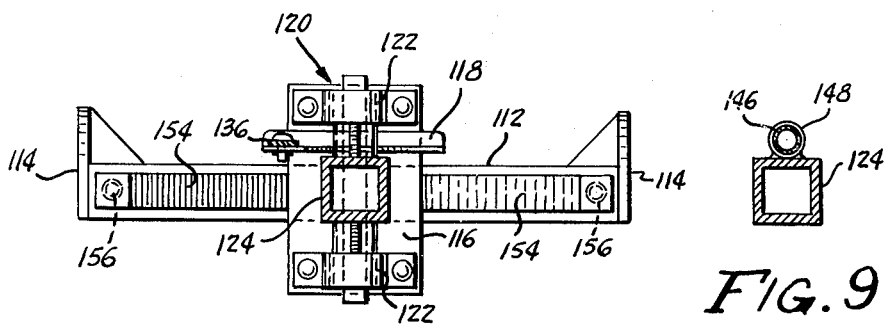
FIG. 8
FIG. 9
INVENTOR.
ARTHUR P. WATERSON
BY
Kimmel & Crowell
ATTORNEYS.

United States Patent Office 3,210,871
Patented Oct. 12, 1965

3,210,871
LAND LEVELER
Arthur P. Waterson, Box 415, Dighton, Kans.
Filed Oct. 29, 1963, Ser. No. 319,829
3 Claims. (Cl. 37—180)

This invention relates to a land leveler or the like having a rearwardly extending feeler element carrying a ground engaging wheel and has as its primary object the provision of an improved device of the type described wherein the rear feeler element is self-steering and constitutes an improvement over my prior patents entitled "Land Leveler," No. 3,034,239 and 3,103,078 and my prior application entitled "Land Leveler," Serial No. 275,138, filed April 23, 1963, now Patent No. 3,159,929 this application being a continuation-in-part of the latter copending application.

Yet another object of the instant invention is the provision of self steering means operatively connected to a rearwardly extending feeler element to maintain the ground engaging wheel carried thereby in the same area as covered by the scraper blade.

A further object of this invention resides in the use of such steering or control means in any instance where an elongated rearwardly extending element is carried by a driving means such as a tractor or the like.

A still further object of this invention is the provision of a self steering rearwardly extending feeler element having stop means operatively connected thereto to limit the radius of turn of the feeler element so that it does not contact the tractor on particularly sharp turns thereby causing damage to either the tractor or the feeler element or both.

Still other objects reside in the combinations of elements, arrangements of parts and features of construction, all as will be more fully pointed out hereinafter and disclosed in the accompanying drawings wherein there are shown preferred embodiments of this inventive concept.

In the drawings:

FIGURE 1 is a side elevational view of one form of land lever to be modified in accordance with the instant invention, shown as attached to a conventional tractor with parts broken away for illustrative clarity;

FIGURE 2 is a fragmentary enlarged top plan view taken substantially along the line 2—2 of FIG. 1, as viewed in the direction indicated by the arrows, the tractor frame being indicated in dotted lines;

FIGURE 3 is an enlarged fragmentary sectional view, with parts thereof being broken away, taken substantially along the line 3—3 of FIG. 1, as viewed in the direction indicated by the arrows;

FIGURE 4 is an enlarged fragmentary detailed sectional view taken substantially along the line 4—4 of FIG. 3, as indicated by the arrows, with parts broken away for illustrative clarity;

FIGURE 5 is an enlarged fragmentary sectional view, taken substantially along the line 5—5 of FIG. 3, as viewed in the direction of the arrows;

FIGURE 6 is a side elevational view of a modified rearwardly extending feeler element which includes control means for positively steering the same to maintain the rear wheel in the area covered by the scraper blade;

FIGURE 7 is a top plan view thereof;

FIGURE 8 is an enlarged transverse cross-sectional view taken substantially on line 8—8 of FIGURE 7; and FIGURE 9 is an enlarged transverse cross-sectional view taken substantially on line 9—9 of FIGURE 7.

Similar reference characters refer to similar parts throughout the several views of the drawings.

Having reference now to the drawing in detail, there is generally indicated at 10 a conventional tractor or driving means of any desired type which includes a frame 11, motor housing 12, with a control station 13 for the operator. The tractor is provided with steerable front wheels 14 mounted on an axle 15 and rear drive wheels 16 mounted on an axle 17 in a conventional manner.

A land leveler in accordance with my copending application Serial No. 275,138 is comprised of an elongated transverse scraper 20 which is provided with end plates 21 and a cutting edge 22. Support bars 24 fixedly secured to the scraper are in turn secured to a plurality of laterally spaced clamping plates 26 which are held by means of opposed clamping plates 27 and bolts 28 in rigid related assembly with a transverse shaft 29. The shaft 29 is rigidly secured as by clamps 30a or welding to an attachor 30c which carries a conventional three-point hitch 30 which is pivotally connected by links 30b to the tractor frame at the rear thereof so that the blade may be raised or lowered to the relative contour of the ground in a manner to be more fully described hereinafter. A heavy steel tubular lifting roll or sleeve 32 has stubs 33 welded in each end supported on totally enclosed bearings 34 fixed to the shaft 29 for rotation of the lifting roll or sleeve 32 and carries at each end a forwardly extending, downwardly inclined support 35 from which depend fixed lugs 36 to the opposite sides of which are fixedly bolted bracket arms 37 which support axles 38, which in turn, carry oppositely disposed guide wheels 39, the arrangement being such that rotation of the lifting roll or sleeve 32 raises or lowers the guide wheels 39 relative to the scraper blade 22, and consequently, varies the effective level of the scraper blade with respect to the ground level G.

An angularly disposed upwardly extending arm 40 is suitably affixed as by welding to lifting roll or sleeve 32 and is pivotally connected as by means of pivot 41 to one end of a hydraulic cylinder 42. The cylinder 42 contains a conventional piston which is connected to a piston rod 43 which is in turn pivotally connected as by a pivot 44 to the upwardly extending portion 45 of a rearwardly extending L-shaped bracket 46 which is in turn fixedly secured to shaft 29. Fluid is supplied to cylinder 42 through conventional fluid connection conduits 47 and 48 which are controlled by conventional hydraulic valve 49 which is supplied with fluid through a fluid conduit 50 with a return fluid conduit 50a to any suitable conventional source (not shown). Valve 49 has a valve control lever 51 (see FIG. 5) which selectively directs fluid through conduit 47 or 48 to move piston rod 43 and through arm 40 to rotate lifting roll or sleeve 32 and vary the relative position of guide wheels 39 with respect to scraper 20 and accordingly, raise or lower cutting edge 22.

The valve 49 is mounted on rear upright 52 which is pivotally mounted on a pivot 53 carried by an arm 53a secured to shaft 29. A rearwardly extending feeler element 54 of any desired length is fixedly secured to a plate 55 which is fixed to and movable with the rear upright 52. Feeler element 54 carries a rear feeler wheel 56 carried on an axle 57 which is supported by a bracket 58 which is weldably mounted to pivot 59 carried by the rear of element 54. The operating lever of control means 51 of valve 49 engages the stop 60, to be more fully described hereinafter.

The stop 60 is operatively connected to a third upright 62, a matter now to be described, so that the effective height of the blade is governed by the conjoint action of the front and rear feeler elements. Stop 60 is mounted adjustably in a smooth sleeve 61, the adjustment being effected by rotating lock nuts 60a and 60b on a threaded rear portion of the stop 60. A spring 61a presses against head 60c on the stop 60 to bias the same into engagement with the lever 51. The lock nuts 60a and 60b allow a safety factor for valve 49 in case the tractor is operated without pressure to the valve 49. This occurs if the operator turns off the pressure while the wheels leave the leveled field at the turning area or at a corner which may be either below or above the grade. The sleeve is mounted on the third upright 62 which is pivoted as at 63 to a lug 64, the lug being secured at 65 to the front upright 66 which is fixed to a longitudinally extending forward valve control member 67 which in turn is pivoted as at 68 to a support carried at 69 by the shaft 29. The arrangement is thus such that when forward control member 67 is rotated about the pivot 68 in a manner to be described more fully hereinafter, the stop 60 moves toward and away from the valve control lever 51 rather than, as previously described, the valve control lever moving toward and away from a stop. A spring 51a carried by the valve housing 49 biases valve control lever normally toward engagement with stop 60.

Manual control means are provided for varying the position of stop 60 and hence control lever 51 independently of either rear feeler element 54 or front feeler element 94 and takes the form of manual control lever 70 which is pivotally secured as at 71 to the top of front upright 66 and which, through a link 72, serves to move the upper end of the third upright 62 to which it is pivoted by means of a pivot 73 so that the valve control lever 51 may control the valve 49 to move the scraper in accordance with the dictates of the operator. Suitable friction means such as pressure plate 70a pivoted at 71 and 71a serve to retain manual control handle 70 in any desired adjusted position. As best shown in FIG. 1, the upper end of control 70 is provided with a handle 75 adjacent the operator's station.

The forward end of forward control member 67 is pivoted by a pivot 80 to a depending link 81 which is pivoted at its other end 82 to a normally horizontal arm 83 of a bellcrank lever 84 which is pivoted on the pivot 85 to a plate 86 supported by bolts and spacers 87 on the side of frame 11 of the tractor. A normally upright arm 88 of bellcrank member 84 is pivoted as by a pivot 89 to a link 90. The other end of link 90 is in turn pivoted as by a pivot 91 to an inclined arm 92 which is fixed to a crossbar 93 which is secured to the end of the front feeler element 94. The front feeler element 94 carries a swivel 95 which supports the bracket 96 which carries an axle 97 upon which is mounted a front feeler wheel 98. Transverse bar 93, in turn, has rearwardly extending end pieces 99 which are pivoted as by means of pivots 100 to offset bracket arms 101 which are, in turn, secured as by bolts and spacers 102 to the sides of frame 11 adjacent the forward end thereof.

The arrangement is such that the forward feeler wheel 98, upon encountering an irregularity in the ground G, for example, a raised portion, will pivot the front feeler element 94 upwardly on its pivot 100 which in turn rotates the inclined arm 92 in a clockwise direction as seen in FIGURE 1, the inclined arm 92 pushing the link 90 to the right in the direction of the double-headed arrow which in turn rotates the bell crank 84 clockwise about the pivot means 85 thereby rotating the normally horizontal arm 83 of the bell crank which lifts the depending link 81 to raise the front end of the forward control member 67 and thereby tilt the front upright 66 clockwise as seen in FIGURE 5 about the pivot 68 so that the stop 60 is moved toward the valve control means 51 biasing the same against the pressure of the spring 51a to actuate the hydraulic valve 49 for feeding fluid pressure through the flexible conduit 47 to the hydraulic cylinder 42 thereby extending the piston rod 43 which rotates the lifting roll 32 and since the guide wheels 39 are carrying the weight of the scraper 20, this above-mentioned action raises the scraper 20 upwardly to correct the deviation caused by the front feeler wheel 98 traveling onto higher elevation. Similarly, a lowering of the front feeler wheel 98 will operate through the above-described linkage to actuate the hydraulic cylinder 42 to retract the piston rod 43 and thereby lower the scraper 20.

It will also be clear now that the bell crank 84 and other linkage forming part of the front feeler acts to compensate for any movement up or down of the tractor front wheels 14 so that the position of the scraper 20 is only controlled by the relationship of the front and rear feeler wheels 98 and 56, respectively. For example, if the front wheels 14 were raised by encountering an irregularity in the ground G, the rear portion of the front feeler element 94 would be raised accordingly since the pivot 100 is secured to the tractor frame 11. This would in turn raise the inclined arm 92 which is carried by the pivot 100. The bell crank 84 would also be raised since its pivot 85 is secured to the tractor frame 11. The link 90 would be moved upwardly parallel to its original position in view of the raising of both pivots 100 and 85 to rotate the bell crank 84 in a counterclockwise direction as seen in FIGURE 1 about its pivot 85, the end of its normally horizontally extending arm 83 remaining stationary. Since the pivot 82 is not raised or lowered by this action, the depending link 81 is not affected and the forward control member 67 remains stationary so that the front upright 66 and the third upright 62 do not move to actuate the hydraulic valve 49. If, however, at any time during the offset position of the front wheels 14, the forward feeler wheel 98 encounteres an irregularity, it will operate as explained hereinabove to actuate the hydraulic valve 49 and thereby move the scraper 20.

Engagement of the rear feeler wheel 56 with an irregularity, such as a raised portion, will pivot the rear feeler element 54 about its pivot means 53 to tilt the rear upright 52 forwardly thereby moving the valve control means 51 of the hydraulic valve 49 into engagement with the stop 60 to feed fluid through the conduit 47 thereby raising the scraper in the same manner as explained hereinbefore on raising of the front feeler wheel 98. Thus, the position of the scraper 20 is actually determined by an average of the positions of the two feeler elements. This will ensure an accurate leveling of the ground surface over a large area.

By positioning a guide wheel 39 in front, and adjacent both ends, of the transverse scraper 20 and the earth which it is carrying or pushing, parallel action of the scraper blade 22 relative to the ground G is ensured. These guide wheels 39 actually carry the weight of the transverse scraper 20 while maintaining alignment of the scraper 20 with the feeler wheels 98 and 56. Moreover, the positioning of the guide wheels forwardly of the load of earth carried by the scraper 20 and near the tractor's drive wheels 16 facilitates in steering of the tractor, while simultaneously maintaining the parallel relationship between the scraper blade 22 and the ground G since each guide wheel 39 carries its end of the transverse scraper 20.

Referring now particularly to FIGS. 6 to 9, there is shown a modified rearwardly extending feeler wheel and element carrying the same generally designated by the reference numeral 110 and comprised basically of a crossframe 112 operatively secured in any conventional manner by forwardly extending arms 114 to the rear upright member 52 in a manner similar to the connection of element 54 thereto in the previous embodiments. Secured to the cross bar 112 is a vertically extending plate member 116 to which is connected a transverse bracket member 118 for movement therewith. A first pivot means 120 passes through the bracket member 118 and is rotatably secured to the plate member 116 by bearing means 122. A single elongated arm 124 of the rearwardly extending feeler element 110 is pivotally secured to the first pivot means which mounts the same about a first vertical pivotal axis. Spaced rearwardly of the first pivot means 120 is a second pivot means 126 secured to the opposite end of the elongated arm 124 and defining a second vertical pivotal axis. A rear feeler wheel 128 is carried by an offset arm 130 operatively secured to the second pivot means 126 and having a rearwardly extending element 132 fixed to the axle 134 thereof, the wheel 128 normally riding on the ground surface G and functioning to actuate the hydraulic valve 49 in the manner disclosed hereinabove. Linkage means operatively connect the first and second pivot means 120, 126, respectively, to rotate the rear wheel 128 about the second pivot means 126 in response to rotation of the bracket member 118 about the first pivot means 120 during a turning movement of the driving means such as the tractor 10. These linkage means include a first link member 136 having one end pivotally secured at 138 to the bracket member 118 laterally offset one side of the first pivot means 120. A transverse link member 140 is fixedly secured to the second pivot means 126 for rotation therewith and has pivotally secured to its end at 142 a second link member 144, the pivotal connections 138 and 142 being laterally spaced on opposite sides of a longitudinal axis between the first and second pivot means 120, 126, respectively. A connecting rod 146 is slidably secured to the elongated arm 124 by sleeve members 148 and has its opposite ends pivotally secured to the first and second link members 136, 144, respectively at 150 and 152.

The self-steering means disclosed in FIGS. 7 to 10 is normally utilized when the rearwardly extending feeler element is particularly elongated, that is, for example, when the same exceeds twenty to thirty feet, however, it is to be understood that it may be utilized with any length feeler element in conjunction with the land leveler of the instant invention, or in any instance where any elongated rearwardly extending element is carried by a driving means and mounts a ground engaging wheel adjacent its rear end. The operation of the device will be apparent. As the driving means turns in use, the bracket member 118 is rotated about the first pivot means 120 and depending upon the direction of turn either pushes or pulls the first link member 136 which in turn similarly actuates the connecting rod 146 and the second link member 144 to rotate the second pivot means 126 through the connection of the transverse link member 140, the rear feeler wheel 128 being steered by rotation of the second pivot means 126 in an obvious manner.

Stop means may be incorporated into the construction of the instant device to limit the angle through which the rearwardly extending feeler element may rotate by the positive steering means thereby avoiding extreme movement of the same about the first pivot means 120 which could cause accidental engagement with the driving means or with other portions of the device of the instant invention damaging either the feeler element itself or the part with which it comes in contact. Such stop means may be comprised of angularly disposed stop arms 154 horizontally aligned with the elongated arm 124 and secured substantially centrally to the transverse element 112 and to outstanding elements 156 adjacent the extremities of the element 112.

From the foregoing it will now be seen there is herein provided an improved land leveler which accomplishes all the objects of this invention, and others, including many advantages of very practical utility and commercial importance.

As many embodiments may be made of this inventive concept and as many modifications may be made in the embodiments hereinafter shown and described, it is to be understood that all matter herein is to be interpreted merely as illustrative and not in a limiting sense.

I claim:
1. (1) In a tractor device,
(2) a frame transversely secured to and across the rear of the device, and pivoted at its front about a transverse horizontal axis,
(3) a transverse bracket member and vertically aligned bearing means, each connected to the rear of said cross frame at its midpoint,
(4) a rearwardly extending straight single arm element normally aligned in plan view with the center line of the tractor device when the latter is travelling in a straight path,
(5) the arm element having a forward end pivotally positioned about a first vertical axis by being mounted within said bearing means, and a rearward end provided with means to vertically pivotally mount a vertical ground engaging wheel,
(6) said wheel also normally aligned in plan view with the center line of the tractor device when the latter is travelling in a straight path,
(7) control means including linkage means operatively connected to said arm, and connected between said transverse bracket member and said pivotal mounting means for the ground engaging wheel, so constructed and arranged as to positively steer said wheel so as to maintain the latter in the path of said tractor device,
(8) said linkage means including a first link member having two ends, one end being pivotally secured to said bracket member at a point laterally offset in plan view to one side of the longitudinal center line of said arm,
(9) a transverse link member having two ends, one end of said transverse link member being fixedly secured to said means to vertically pivotally mount said wheel for rotation therewith,
(10) a second link member having two ends, one end of said second link member being pivotally secured to an end point on said transverse link member,
(11) said lateral offset connection points of said first link member and said second link member being on opposite sides in plan of the longitudinal center line of said arm,
(12) and a connecting rod slidably secured adjacent each of its ends to said arm adjacent the center line of the arm, said connecting rod having two ends, opposite ends being pivotally secured to the other ends of said first and second link members.
2. (1) In a tractor device,
(2) a frame transversely secured to and across the rear of the device, and pivoted at its front about a transverse horizontal axis,
(3) a transverse bracket member and vertically aligned bearing means, each connected to the rear of said cross frame at its midpoint,
(4) a rearwardly extending straight single arm element normally aligned in plan view with the center line of the tractor device when the latter is travelling in a straight path,
(5) the arm element having a forward end pivotally positioned about a first vertical axis by being mounted within said bearing means, and a rearward end provided with means to vertically pivotally mount a vertical ground engaging wheel,
(6) said wheel also normally aligned in plan view with the center line of the tractor device when the latter is travelling in a straight path,
(7) control means including linkage means operatively connected to said arm, and connected between said transverse bracket member and said pivotal mounting means for the ground engaging wheel, so constructed and arranged as to positively steer said wheel so as to maintain the latter in the path of said tractor device,
(8) stop means to limit rotation of said arm,
(9) said stop means consisting of a pair of rearwardly and longitudinally outstanding horizontal elements each secured at one end to said cross frame near a transverse extremity of the frame,
(10) and a pair of rearwardly and outwardly diverg- ing stop arms fixed at each forward end to the rear of said cross frame at points near the middle of the latter, and fixed at each rear end to rear ends of said horizontal elements, said stop arms being at the same height as said pivoted arm element,
(11) to thus limit the angle through which the pivoted arm may rotate by the positive steering means.

3. (1) In a tractor device,
(2) a frame transversely secured to and across the rear of the device, and pivoted at its front about a transverse horizontal axis,
(3) a transverse bracket member and vertically aligned bearing means, each connected to the rear of said cross frame at its midpoint,
(4) a rearwardly extending straight single arm element normally aligned in plan view with the center line of the tractor device when the latter is travelling in a straight path,
(5) the arm element having a forward end pivotally positioned about a first vertical axis by being mounted within said bearing means, and a rearward end provided with means to vertically pivotally mount a vertical ground engaging wheel,
(6) said wheel also normally aligned in plan view with the center line of the tractor device when the latter is travelling in a straight path,
(7) control means including linkage means operatively connected to said arm, and connected between said transverse bracket member and said pivotal mounting means for the ground engaging wheel, so constructed and arranged as to positively steer said wheel so as to maintain the latter in the path of said tractor device,
(8) said tractor device comprising a land leveler having a forwardly extending single arm feeler element and said rearwardly extending single arm is a feeler element, said tractor device pivotally carrying both said feeler arm elements,
(9) transverse scraper means also carried by said tractor device and being pivotally related about a horizontal axis to said single rear arm and fixedly related to said single forward arm,
(10) and hydraulic means operatively connected between said feeler arms and said scraper means to move said scraper means in response to a vertical pivotal movement in either of said feeler arms.

References Cited by the Examiner
UNITED STATES PATENTS

| | | | |
|---|---|---|---|
| 2,127,057 | 8/38 | Drake | 280—443 |
| 2,322,342 | 6/43 | Bunn | 172—285 X |
| 2,510,179 | 6/50 | Johnson. | |
| 2,653,032 | 9/53 | Ellis | 280—442 |
| 2,662,314 | 12/53 | Lindeman et al. | 37—180 |
| 2,982,363 | 5/61 | Sweet et al. | 280—444 X |
| 3,034,239 | 5/62 | Waterson | 37—180 |
| 3,061,020 | 10/62 | Mannheim | 172—285 |

ABRAHAM G. STONE, *Primary Examiner.*
WILLIAM A. SMITH III, *Examiner.*